Dec. 3, 1946.   S. E. BOUCHARD   2,412,076
GOGGLES
Filed June 10, 1944
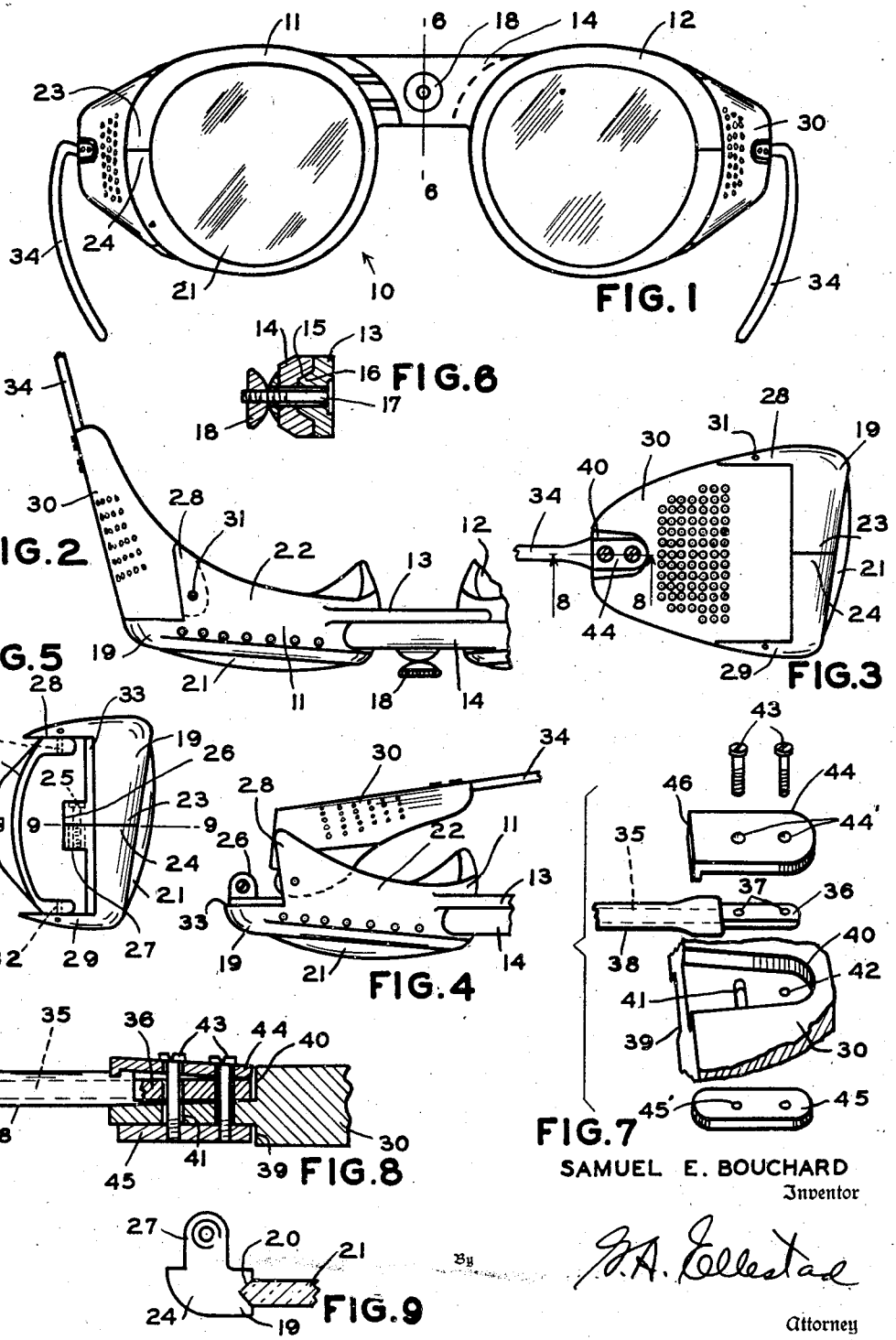
SAMUEL E. BOUCHARD
Inventor
Attorney Patented Dec. 3, 1946

2,412,076

UNITED STATES PATENT OFFICE 2,412,076

GOGGLES

Samuel E. Bouchard, Brighton, N. Y., assignor to Bausch & Lomb Optical Company, Rochester, N. Y., a corporation of New York Application June 10, 1944, Serial No. 539,692

5 Claims. (Cl. 2—14)

This invention relates to goggles and more particularly it has reference to goggles embodying folding side shields and means for readily removing and inserting the lenses so as to adapt the goggle especially for holding prescription lenses.

One of the objects of my invention is to provide a goggle of the type described which can be readily manufactured and which will be simple in construction, yet convenient and efficient in use. A further object is to provide a goggle wherein the lenses and side shields are removably secured. Another object is to provide a goggle embodying bridge and temple means which can be readily adjusted in accordance with the facial features of the wearer. These and other objects and advantages reside in certain novel features of construction, arrangement, and combination of parts as will hereinafter be more fuly described and pointed out in the appended claims.

Referring to the drawing:

Fig. 1 is a front view of a goggle embodying my invention.

Fig. 2 is a fragmentary top plan view of same.

Fig. 3 is a fragmentary side view.

Fig. 4 is a top plan view of the eyecup with the side shield folded.

Fig. 5 is a side view of same.

Fig. 6 is a sectional view taken on line 6—6 of Fig. 1.

Fig. 7 is an exploded view showing the parts for connecting the temple to the side shield.

Fig. 8 is a sectional view taken on line 8—8 of Fig. 3.

Fig. 9 is a view taken on line 9—9 of Fig. 5.

A preferred embodiment of my invention is disclosed in the drawing wherein 10 indicates, generally, a goggle having the two eyecups 11 and 12. Extending laterally from the nasal sides of the respective eyecups 11 and 12 are the bridge arms 13 and 14 which are positioned in overlapping engagement. The rear face of arm 14 is provided with a groove 15 within which is slidably mounted the projection 16 located on the front face of the rear arm 13. A screw 17 passes through a slot in arm 13 and an aperture in arm 14 to receive a threaded nut 18 for holding the bridge arms in adjusted position.

As will be apparent to those skilled in the art, the construction of the two eyecups 11 and 12 is the same and hence a detailed description will only be given of the eyecup 11. The eyecup 11 has a front lens holding portion 19 provided with a grooved seat 20 for holding the lens 21. The eyecup 11 also has rearwardly extending integral parts 22 for contacting the nose and other portions of the face of the wearer. The temporal side of the eyecup 11 is split to provide the two free ends 23 and 24 which are detachably held together, so as to clamp the edge of the lens 21 by means of a screw 25 passing through a rearwardly extending lug 26 and threadedly engaging a member in rearwardly extending lug 27. The temporal portion of the eyecup 11 is cut away so as to provide the spaced upper and lower projections 28 and 29. The side shield 30 is pivotally mounted between the projections 28 and 29 by means of short pivot pins 31 and 32 which cooperate, respectively, with bearing openings formed in the projections 28 and 29. The forward end of the opening in the temporal side of the eyecup 11 is defined by a rabbeted edge 33 which extends from the projection 28 down to the projection 29. When the goggle is on the face of the wearer, the side shield 30 substantially closes the opening in the temporal side of the eyecup and the forward edge of the shield 30 engages the rabbeted edge 33 so that a tight joint is provided.

The goggle may be held in position on the head of the wearer by any suitable means such as the temples, indicated generaly at 34. The temple 34 comprises an inner metal portion 35 which terminates in a flat joint 36 having two apertures 37. In order to assure greater comfort to the wearer, a covering 38, such as a tube of flexible plastic material, may be slid over the free end of the temple 35. The rear portion of shield 30 is provided with the recesses 39 and 40 on its inner and outer faces, respectively. A slot 41 and an aperture 42 extend through the remaining material of the shield 30 to connect the two recesses 39 and 40. The temple joint 36 is positioned in slot 40 and held in adjusted position by means of the screws 43 passing through openings 44' in the plate 44, the openings 37, the slot and opening 41 and 42, and engaging the threaded openings 45' in the plate 45. Since the plate 45 is narrower than the width of the slot 39, the temple may be angularly adjusted by loosening the screws 43 and then secured in the adjusted position by tightening the screws 43. The plate 44 has a down-turned portion 46 which engages the covering 38 and thereby holds the latter against accidental removal from the temple 35.

From the foregoing it will be apparent that I am able to attain the objects of my invention and provide an improved goggle in which the lenses and side shields are removably secured.

My improved goggle is well adapted for the use of prescription lenses required to correct the vision of the wearer. The lenses may be readily removed by means of the screws 25 and because of the construction of the lens holding means, lenses, having drop oval or other non-circular shapes, may be used. The side shield 30 may also be readily removed by loosening the screw 25 so as to separate the projections 28 and 29 and disengage the pivot pins 31 and 32. The angular position of the temples and the width of the bridge may be adjusted as has been previously described. The construction of my goggle is such that it readily lends itself to manufacture in molded plastic form and the structure and coaction of the parts facilitates assembly. Suitable ventilating apertures are, of course, provided in the eyecups and side shields. Various modifications may obviously be made without departing from the spirit of my invention as pointed out in the appended claims.

I claim:

1. A goggle eyecup comprising lens holding means extending around the edge of a lens, spaced face-engaging portions extending rearwardly from the lens holding means at the top and bottom sides of the temporal part thereof, a side shield pivotally mounted between said spaced portions, a head engaging member attached to the rear end of the shield, said means being split at the temporal edge of the lens to provide two free ends, and means for detachably securing the free ends together whereby the lens and side shield are removably held in position by said last named means.

2. A goggle eyecup comprising lens holding means surrounding the edge of a lens, face engaging means extending rearwardly from the lens holding means, the rear temporal portion of the face engaging means being cut away to provide an opening defined by upper and lower parts and a front part, a side shield, head engaging means secured to the rear of said shield, said shield mounted in said opening, the forward end of said shield being pivotally mounted between said upper and lower parts, said front part and said lens holding means being severed at their temporal sides to provide free end portions and means for detachably holding said end portions together whereby the lens and shield are removably held in the eyecup.

3. A goggle eyecup comprising a front lens holding portion, a face engaging part extending rearwardly from said lens holding portion, a projection extending rearwardly from the upper and the lower sides of the temporal side of the lens holding portion and defining an opening, a side shield mounted in said opening, the upper and lower sides of said shield being pivoted, respectively, to said projections, a head engaging member secured to the rear end of the shield, said lens holding portion being split at its temporal side, a lug projecting from each spilt end of the lens holding portion, and retaining means for detachably connecting the lugs, said lens holding portion having a rabbet connecting said projections, the forward end of the shield engaging said rabbet when the goggle is worn.

4. In a goggle, the combination of an eyecup, a side shield mounted on the temporal side of the eyecup, a temple secured to the rear of the shield, and means for securing the temple in adjusted angular position, said means comprising a recess in said shield, a member smaller than said recess and movable therein, and retaining means passing through said temple and shield and secured to said member.

5. In a goggle, the combination of an eyecup, a side shield pivotally mounted on the temporal side of the eyecup, a temple secured to the rear of the shield, and means for securing the temple in adjusted angular position, said means comprising a recess in said shield, a member smaller than said recess and movable therein, and retaining means passing through said temple and shield and secured to said member, a covering on said temple and a second member engaging said covering for holding it on the temple, said retaining means also passing through said second member.

SAMUEL E. BOUCHARD.